United States Patent
Williams et al.

(10) Patent No.: US 12,206,765 B2
(45) Date of Patent: Jan. 21, 2025

(54) PAYLOAD AUTHENTICATION PRIOR TO COMPLETION OF PAYLOAD FULFILLMENT

(71) Applicant: Hewlett-Packard Development Company, L.P., Spring, TX (US)

(72) Inventors: Kathryn Williams, Boise, ID (US); Marcos Teres Nieto, Boise, ID (US); Sean Collison, Boise, ID (US); Steven Holland, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 260 days.

(21) Appl. No.: 17/997,181

(22) PCT Filed: May 11, 2020

(86) PCT No.: PCT/US2020/032297
§ 371 (c)(1),
(2) Date: Oct. 26, 2022

(87) PCT Pub. No.: WO2021/230851
PCT Pub. Date: Nov. 18, 2021

(65) Prior Publication Data
US 2023/0198748 A1    Jun. 22, 2023

(51) Int. Cl.
*H04L 9/08*    (2006.01)
*G06F 21/44*    (2013.01)
*H04L 9/32*    (2006.01)

(52) U.S. Cl.
CPC ............ *H04L 9/0833* (2013.01); *G06F 21/44* (2013.01); *H04L 9/321* (2013.01)

(58) Field of Classification Search
CPC ........ H04L 9/0833; H04L 9/321; G06F 21/44
See application file for complete search history.

(56) References Cited

U.S. PATENT DOCUMENTS

| | | | |
|---|---|---|---|
| 2006/0026197 A1* | 2/2006 | Quinn | G06Q 10/08 |
| 2009/0207439 A1* | 8/2009 | Oomura | G06F 21/608 358/1.15 |
| 2010/0306112 A1 | 12/2010 | Tseng | |
| 2011/0317215 A1* | 12/2011 | Ida | G06F 3/1222 358/1.15 |
| 2013/0124359 A1 | 5/2013 | Hedges et al. | |
| 2014/0036301 A1* | 2/2014 | Nieto | G06F 3/1238 358/1.15 |

(Continued)

FOREIGN PATENT DOCUMENTS

| | | |
|---|---|---|
| JP | 2004295357 A | * 10/2004 |
| WO | 2014/059439 A1 | 4/2014 |

*Primary Examiner* — Chau Le
(74) *Attorney, Agent, or Firm* — Michael Dryja (57) ABSTRACT

An authentication device receives a unique fulfillment identifier from a client device prior to payload fulfillment. The unique fulfillment identifier corresponds to a unique payload identifier of a specific payload and a unique group identifier of a group of payloads including the specific payload. The authentication device authenticates the unique payload identifier based on the unique group identifier. In response to successfully authenticating the unique payload identifier based on the unique group identifier, the authentication device transmits an indication of successful authentication of the payload to the client device.

15 Claims, 6 Drawing Sheets

(56) References Cited

U.S. PATENT DOCUMENTS

| | | | |
|---|---|---|---|
| 2014/0049795 A1* | 2/2014 | Arpino | G06F 3/1208 |
| | | | 358/1.15 |
| 2014/0095398 A1 | 4/2014 | Lin | |
| 2015/0013021 A1 | 1/2015 | Johnson | |
| 2016/0092875 A1 | 3/2016 | Howe | |
| 2017/0212713 A1* | 7/2017 | Ielsch | G06F 3/1211 |
| 2019/0028609 A1 | 1/2019 | Morita | |
| 2019/0370452 A1 | 12/2019 | Nakajima et al. | |
| 2021/0181654 A1* | 6/2021 | Schmidt | G03G 15/0863 |

* cited by examiner

PAYLOAD AUTHENTICATION PRIOR TO COMPLETION OF PAYLOAD FULFILLMENT

BACKGROUND

In the context of computing devices, systems, and networks, as well as in other contexts, authentication technology can be important. Authentication technology is technology that verifies identity. For instance, authentication technology can be used to authenticate a payload. In contrast with identification technology, which is used to indicate or assert the identity of a payload, authentication technology can thus be used to verify or confirm an indicated or asserted identity of the payload. The payload may be a physical person or object, or digital data. In the case of a physical object, authentication technology can ensure that the object is not counterfeit, for example.

DETAILED DESCRIPTION

As noted in the background, authentication technology can verify the asserted or indicated identity of a payload. Authentication may be performed after fulfillment. For example, in the case of a physical object, authentication may not be performed until the party seeking to verify that the object is what it has been purported to be has physical access if not possession of the object. Such a party may thus be unable to verify that the object is not counterfeit until the party receives physical access to the object after payload fulfillment has been completed. Many authentication technologies, however, are predicated on such physical access. For example, a user has to have physical access to an object to leverage anti-counterfeiting technologies that pertain to the packaging or labeling of the object.

Techniques described herein, by comparison, provide for payload authentication prior to completing payload fulfillment. A client device can receive from a fulfillment device a unique fulfillment identifier associated with payload fulfillment, and by which authentication of a payload can occur. The fulfillment device can generate the unique fulfillment identifier based on a unique payload identifier of the specific payload in question, as well as on a unique group identifier of a group of payloads including the specific payload.

The client device can then transmit the unique fulfillment identifier to an authentication device to authenticate the unique payload identifier of the specific payload, and thus to authenticate the payload itself. The authentication device, upon successfully authenticating the unique payload identifier, transmits an indication of such successful authentication back to the client device. At that time, the client device may complete fulfillment of the payload at the fulfillment device.

The techniques described herein can thus provide for payload authentication after initiation of payload fulfillment but prior to completion of such fulfillment. Once the fulfillment device has identified the specific payload that will be used to complete payload fulfillment, the fulfillment device can at that time determine the unique payload identifier of this payload as well as the unique group identifier of the group of payloads including the specific payload. As such, once the fulfillment device has identified the specific payload, the fulfillment device can generate the unique fulfillment identifier associated with the payload fulfillment.

Because payload authentication occurs prior to completion of payload fulfillment, the party (e.g., a user) of the client device can verify in the case in which the payload is a physical object that the specific payload is authentic (viz., not counterfeit) prior to having physical access to the object. Once payload fulfillment occurs and the party has physical access to the object, the party then may just have to verify that the unique payload identifier of the object is the same unique payload identifier that the fulfillment device used to generate the unique fulfillment identifier. The techniques describe herein can thus provide for anti-counterfeiting technology that does not rely on the packaging or labeling of the object.

Figure 1:
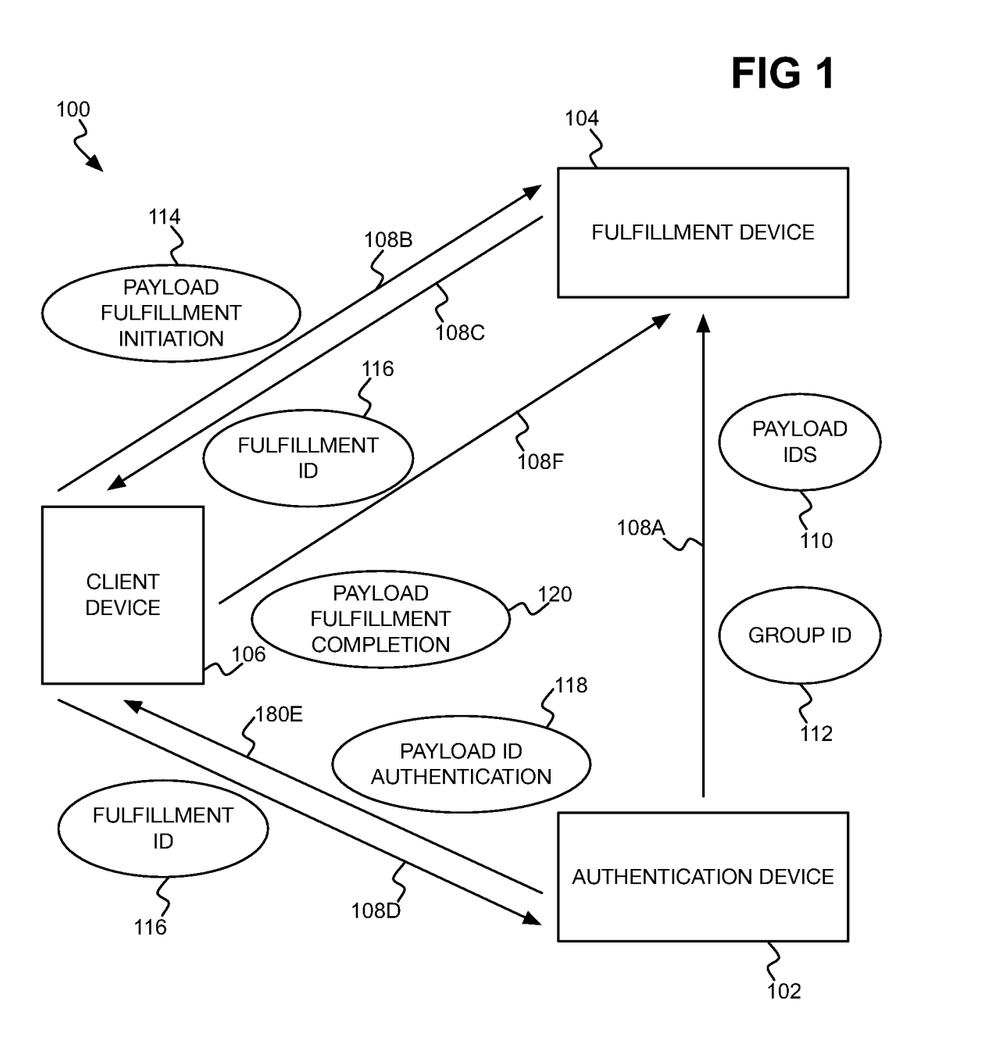
FIG. 1 is a diagram of an example system for payload authentication prior to completion of payload fulfillment.

FIG. 1 shows an example system 100 for payload authentication prior to completion of payload fulfillment. The system 100 includes an authentication device 102, a fulfillment device 104, and a client device 106. The devices 102, 104, and 106 may be communicatively connected over a network, such as wired and wireless networks, intranets, extranets, the Internet, and so on. The devices 102, 104, and 106 can each be a computing device. For example, the authentication and fulfillment devices 102 and 104 may be servers, whereas the client device 106 may be a desktop or laptop computer, tablet, smartphone, or other computing device, including a peripheral device such as a printer.

The devices 102, 104, and 106 may be operated by or for different parties, such as users or entities. For example, the authentication device 102 may be operated by or for the party that provides, creates, fabricates, generates, or manufactures payloads. By comparison, the fulfillment device 104 may be operated by or for the party that fulfills the payloads for end users. The client device 106 may thus be operated by or for an end user of a payload that the party of the authentication device 102 generates and that the party of the fulfillment device 104 fulfills.

An overview of an example payload fulfillment process is now described in relation to FIG. 1. More detailed aspects of this process are then described with subsequent reference to FIGS. 2, 3, and 4. Prior to initiation of payload fulfillment, the authentication device 102 transmits payload identifiers 110 and a payload group identifier 112 to the fulfillment device 104, per arrow 108A.

The payload identifiers 110 are payload identifiers of payloads. Each payload identifier 110 is unique among the payload identifiers of the payloads of a given type. The group identifier 112 is a payload group identifier of the group of payloads having the payload identifiers 110. The group identifier 112 is unique among payload group identifiers of groups of payloads of a given type.

The client device 106 transmits a request for payload fulfillment initiation 114 to the fulfillment device 104, per arrow 108B. Requesting payload fulfillment initiation 114 means that the client device 106 is requesting that the fulfillment device 104 fulfill a payload of a given type on behalf of the client device 106. However, the specific payload on which basis payload fulfillment will actually be completed is not identified by the client device 106, or otherwise at the time of payload fulfillment initiation 114.

Rather, after payload fulfillment initiation 114 has been requested, the fulfillment device 104 selects or identifies the specific payload on which basis completion of payload fulfillment will occur. At this time, the fulfillment device 104 can determine the unique payload identifier of the selected specific payload, and the unique group identifier of the group of payloads including this payload. The fulfillment device 104 generates and transmits to the client device 106 a unique fulfillment identifier 116, per arrow 108C.

The unique fulfillment identifier 116 is associated with the payload fulfillment that the client device 106 has initiated, and is further with respect to the specific payload that the fulfillment device 104 has selected to complete the payload fulfillment. The unique fulfillment identifier 116 is unique among fulfillments of payloads of a given type. The fulfillment device 104 generates the unique payload identifier based on the unique payload identifier of the specific payload and on the unique group identifier of the group of payloads including this payload.

Upon receipt of the unique fulfillment identifier 116, and prior to payload fulfillment completion, the client device 106 can transmit the received fulfillment identifier 116 to the authentication device 102 for authentication of the unique payload identifier of the specific payload in question, per arrow 108D. The authentication device 102 authenticates the unique payload identifier, and thus the specific payload itself, based on the payload fulfillment identification 116 that it receives from the client device 106. For example, the authentication device 102 can determine from the unique fulfillment identifier 116 the unique payload identifier of the specific payload and the unique group identifier of the group of payloads including this payload, and authenticate the unique payload identifier using the unique group identifier.

The authentication device 102 transmits an indication of the unique payload identifier authentication 118 to the client device 106, per arrow 108E. For instance, the authentication device 102 can notify the client device 106 whether authentication was successful or unsuccessful. If authentication was successful, the client device 106 may then transmit a request to the fulfillment device 104 to process payload fulfillment completion 120, per arrow 108F. The fulfillment device 104 therefore completes payload fulfillment with respect to the specific payload after the client device 106 has approved authentication of this payload. That is, authentication of the unique payload identifier of this specific payload, and thus of the payload itself, occurs prior to payload fulfillment completion 120.

Figure 2:
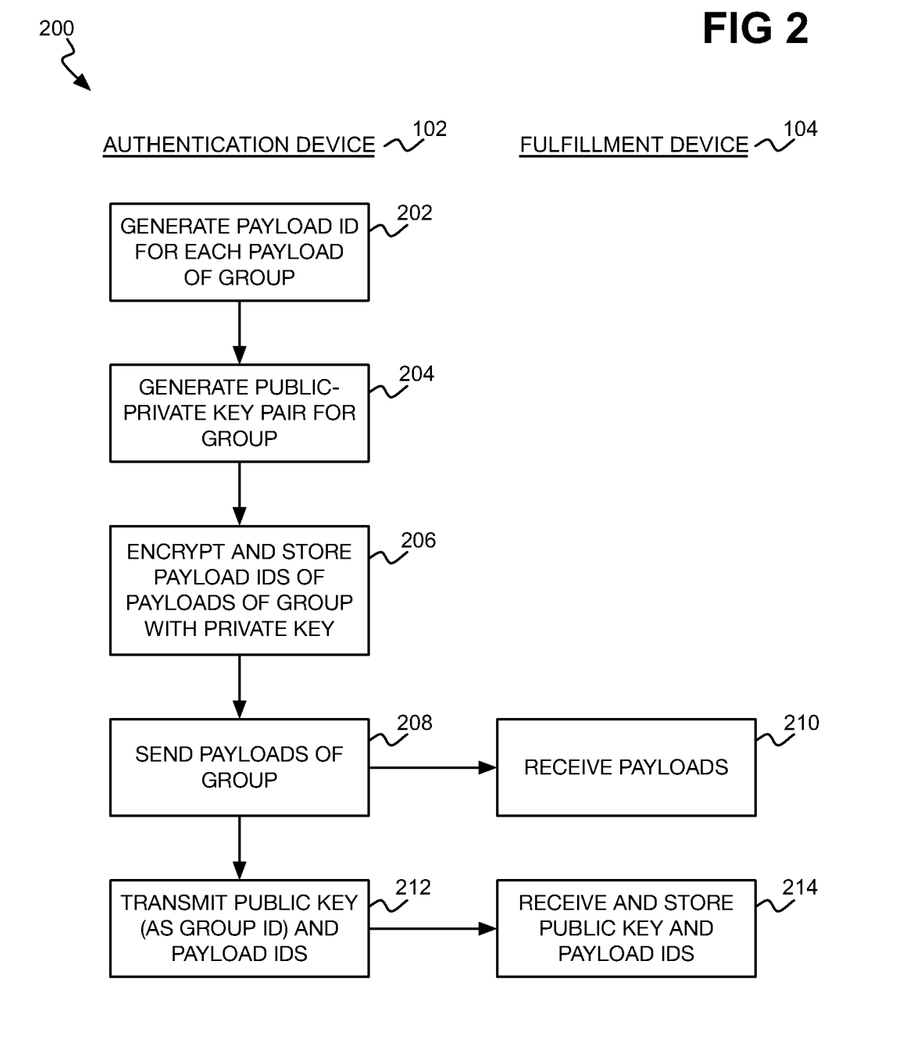
FIG. 2 is a flowchart of an example method performed by an authentication device and a fulfillment device prior to initiation of payload fulfillment.

FIG. 2 shows an example method 200 performed by the authentication device 102 and the fulfillment device 104 prior to the client device 106 initiating payload fulfillment. The authentication device 102 performs the parts of the method 200 in the left column and the fulfillment device 104 performs the parts of the method 200 in the right column. The method 200 can be implemented as program code stored on a non-transitory computer-readable data storage medium and executed by a processor of a computing device like the device 102 or 104.

The authentication device 102 generates a unique payload identifier for each payload within a group of payloads (202). The payloads may be of a given type. For example, the group of payloads may be a group of physical objects, such as a specific lot of printing device consumable items of the same type, like inkjet or toner cartridges of the same color. The unique payload identifiers in such an example may be the serial numbers of the physical objects.

More specifically, for instance, the party of the authentication device 102 may be the manufacturer or supplier of the physical objects. A manufacturer may generate the unique payload identifiers, such as unique serial numbers, at the time the physical objects are manufacturer or packaged. A supplier may generate the unique payload identifiers by receiving specification of the identifiers at the time of ordering or receipt of the objects from the manufacturer.

The authentication device 102 also generates and stores an asymmetric cryptographic public-private key pair for the group of payloads (204). The key pair includes a public key and a private key. The unique group identifier of the group of payloads may be the public key. The authentication device 102 maintains confidentiality of the private key, and may not share the private key with the computing device of another party, such as the party of the fulfillment device 104.

The party of the fulfillment device 104 may be a reseller of physical objects supplied or manufactured by the party of the authentication device 102. The reseller may order one or multiple lots of the physical objects from the manufacturer or supplier, and then stock the physical objects of the same or different lots at different warehouses at different geographic locations for resale. The authentication device 102 may generate the public-private key pair at the time the reseller places an order for a lot of the objects.

The authentication device 102 encrypts the payload identifiers of the group using the private key, and stores the encrypted payload identifiers within a database at the authentication device (206). The authentication device 102 may also encrypt and store other information regarding the payload identifiers. For example, such information can include the identity of the reseller that ordered the corresponding group of physical objects. As another example, the information can specify, for each payload identifier, that the respective physical object has not yet been (re)sold to an end user, and in the case of a printing device consumable item, that the object has not yet been installed within a printing device.

The authentication device 102 transmits the payloads of the group to the fulfillment device 104 (208), which responsively receives the payloads (210). For example, in the case of a group of physical objects, the authentication device 102 can initiate shipping of the physical objects to one warehouse or to multiple warehouses of the reseller of the fulfillment device 104, as specified by the reseller. As another example, the authentication device 102 can provide an indication as to which physical objects have been shipped to which warehouses of the reseller. The fulfillment device 104 thus receives the payloads in that it may receive indication of such shipment from the authentication device 102, including shipment tracking numbers.

The authentication device 102 further transmits the generated public key, as the unique group identifier of the group of payloads, and the payload identifiers in unencrypted (e.g., plaintext) form to the fulfillment device 104 (212). The fulfillment device 104 responsively receives and stores the unique group identifier and the payload identifiers (214). As noted above, the fulfillment device 104 does not receive the private key, which remains confidential to the authentication device 102 or to at least the party of the device 102.

Figure 3:
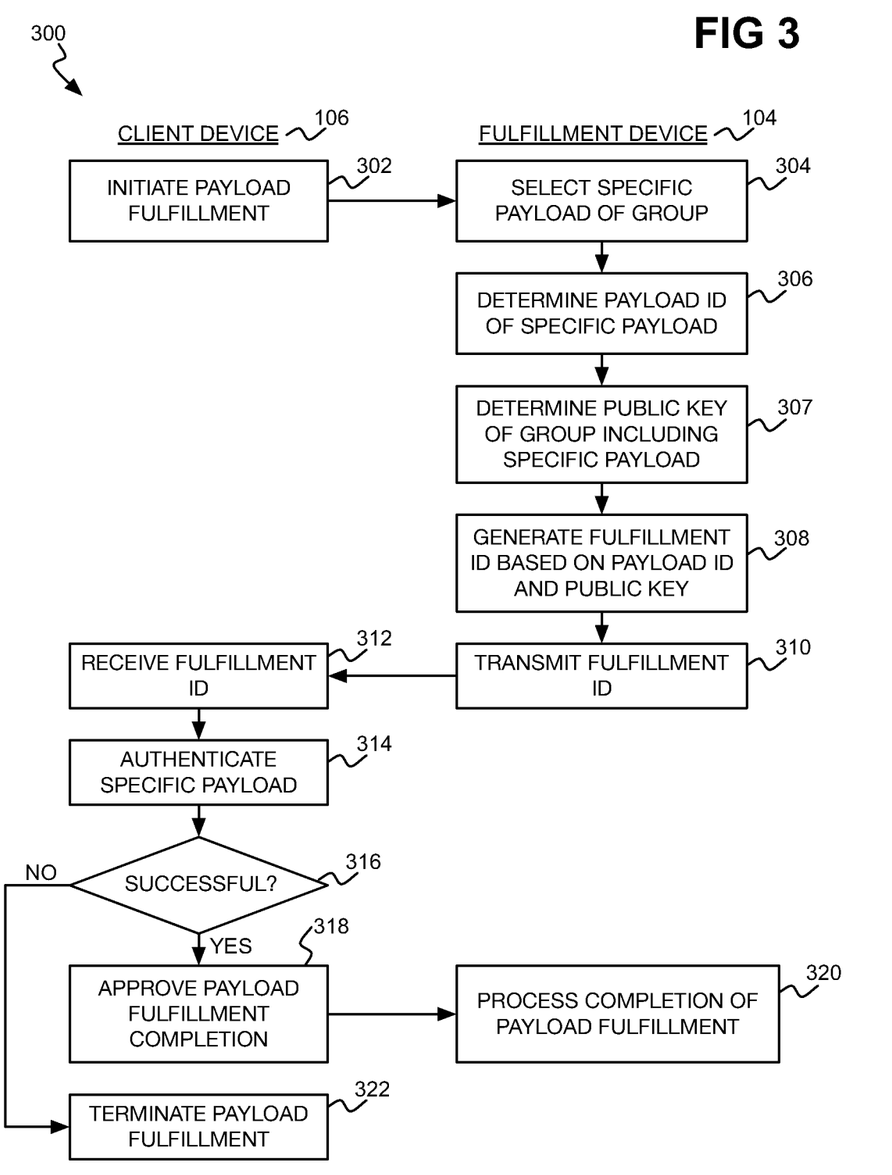
FIG. 3 is a flowchart of an example method performed by a client device and a fulfillment device from initiation to completion of payload fulfillment.

FIG. 3 shows an example method 300 performed by the client device 106 and the fulfillment device 104 for payload fulfillment, from fulfillment initiation to fulfillment completion. The client device 106 performs the parts of the method 300 in the left column, and the fulfillment device 104 performs the parts of the method 300 in the right column. The method 300 can be implemented as program code stored on a non-transitory computer-readable data storage medium and executed by a processor of a computing device like the device 106 or 104.

The client device 106 transmits a request to initiate fulfillment of a payload of a given type to the fulfillment device 104 (302). For example, the payload may be a physical object of the given type, and which a reseller operating the fulfillment device 104 has stocked in multiple warehouses at different geographic locations. The user of the client device 106 may thus be an end user or party that is purchasing the object from the reseller. For instance, the client device 106 may be running a web browser accessing a web site of the reseller hosted by the fulfillment device 104, or may be running an app provided by the reseller and which accesses the device 104.

In such an example, payload fulfillment can mean the ordering process that the end user performs at the client device 106 in conjunction with the fulfillment device 104 of the reseller. Payload fulfillment may be initiated when the end user first virtually places the physical object of the given type (e.g., a particular model of printing device consumable item in a specific color) within a virtual shopping cart. Payload fulfillment may be completed when the end user completes the order, such as when payment of the order has been successfully processed by the fulfillment device 104.

After receiving the request to initiate payload fulfillment, the fulfillment device 104 selects the specific payload of the given type by which fulfillment will be completed (304). For example, the end user may have specified a given type of physical object that is stocked at multiple warehouses of the reseller of the fulfillment device 104. In such instance, the fulfillment device 104 does not select (i.e., allocate or reserve) the actual physical object until the device 104 has received the shipping address to which the object is to be sent. Once the fulfillment device 104 has received the shipping address from the client device 106, the device 104 can then select (i.e., allocate or reserve) a specific physical object of the given type from the warehouse geographically closest to this address, for instance.

Once the specific payload on which basis payload fulfillment will be completed has been selected, the fulfillment device 104 can determine the unique payload identifier of the selected payload (306). The unique payload identifier may be determined at the same time the specific payload is itself selected, including as part of the selection process. For example, the unique payload identifier may be the serial number of the actual physical object that will be sent to the shipping address to fulfill the order initiated at the client device 106.

The fulfillment device 104 further determines the public key of the group of payloads including the specific payload (307). The public key in this implementation is the unique group identifier of the group of payloads including the specific payload. As noted above, the fulfillment device 104 previously received the public key from the authentication device 102 in FIG. 2.

The fulfillment device 104 then generates a unique fulfillment identifier based on the payload identifier of the specific payload and the public key of the group of payloads including the specific payload (308). As one example, the fulfillment device 104 may generate a hash by inputting the payload identifier and the public key into a two-way (viz., reversible) hash algorithm. As another example, the fulfillment device 104 may concatenate or otherwise combine the payload identifier and the public key.

The fulfillment device 104 transmits the generated unique fulfillment identifier to the client device (310). The fulfillment device 104 may transmit the unique fulfillment identifier in textual or graphical form. As an example of the former, the fulfillment device 104 may transmit a series of alphanumeric digits that constitute the unique fulfillment identifier. As an example of the latter, the fulfillment device 104 may transmit an image, such as a two-dimensional barcode like a Quick Response (QR) code that encodes the unique fulfillment identifier.

The client device 106 responsively receives the unique fulfillment identifier (312), and authenticates the specific payload at the authentication device 102 using this identifier (314). For example, the client device 106 may provide the unique fulfillment identifier in textual form to the authentication device 102 at an authentication web site hosted by the device 102. As another example, the client device 106 may capture a digital image of the unique fulfillment identifier in graphical form, which causes the client device 106 to access the web site and automatically provide the fulfillment identifier to the authentication device 102.

How the client device 106 authenticates the specific payload at the authentication device 102 is described later in the detailed description with reference to FIG. 4. If authentication is successful (316), then the client device 106 can approve payload fulfillment completion (318), with the fulfillment device 104 responsively processing such completion (320). By comparison, if authentication is unsuccessful (316), then the client device 106 may instead terminate payload fulfillment completion (322), such that the fulfillment device 104 does not complete fulfillment.

For example, as noted above, payload fulfillment may pertain to the ordering of a physical object of a given type by an end user of the client device 106 from the reseller of the fulfillment device 104. If authentication is successful, the client device 106 may thus transmit a request to the fulfillment device 104 to process payment for the order of the specific physical object having the unique payload identifier that has been successfully authenticated. By comparison, if authentication is unsuccessful, the client device 106 may not complete or finish the order.

In the method 300, then, payload authentication occurs prior to completion of payload fulfillment. This means, for instance, that in the case in which payload fulfillment pertains to an end user ordering a physical object of a given type from a reseller, the end user is able to verify that the object that is to be shipped is not counterfeit, prior to the user completing the order. Authentication in this instance further does not rely upon physical access to the object. The user is able to verify authenticity of the physical object even before the reseller ships the object to the user.

In this example, the user may just have to verify that the unique payload identifier of the physical object, such as the object's unique serial number, matches the payload identifier on which basis authentication was performed, when the user receives the object from the reseller. The fulfillment device 104 may provide this information to the client device 106 with the unique fulfillment identifier, or the authentication device 102 may provide the information to the client device 106 as decoded from the unique fulfillment identifier. Additional authentication may also be performed once the physical object has been received, such as by the printing device in which the object is installed in the case of a printing device consumable item.

As part of the payload fulfillment completion process of part 320, the fulfillment device 104 may transmit to the authentication device 102 information concerning completion of payload fulfillment. For example, the fulfillment device 104 may notify the authentication device 102 that the physical object has been sold, and may further provide the authentication device 102 partial or complete information regarding the shipping address of the end user of the client device 106 or the intended end use location of the object as provided by the end user. The authentication device 102 may also use this information when authenticating the physical object.

Figure 4:
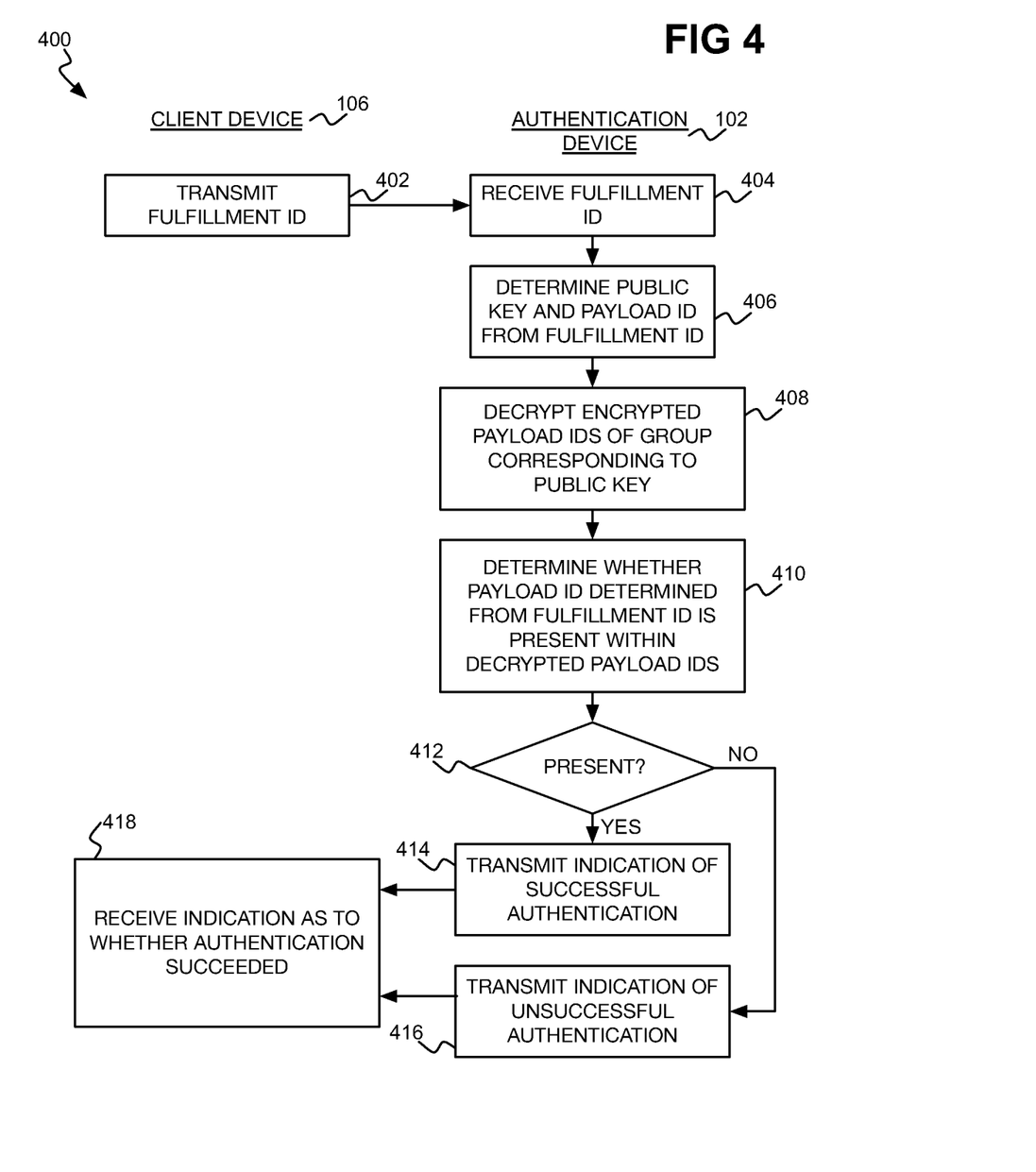
FIG. 4 is a flowchart of an example method performed by a client device and an authentication device for payload authentication.

FIG. 4 shows an example method 400 performed by the client device 106 and the authentication device 102 to authenticate a specific payload. The client device 106 performs the parts of the method 400 in the left column, and the authentication device 102 performs the parts of the method 400 in the right column. The method 400 can be implemented as program code stored on a non-transitory computer-readable data storage medium and executed by a processor of a computing device like the device 106 or 102. The method 400 can be performed to realize part 314 of FIG. 3.

The client device 106 transmits a unique fulfillment identifier, which the device 106 previously received from the fulfillment device 104, to the authentication device 102 (402). Upon receiving the unique fulfillment identifier (404), the authentication device 102 determines the public key and the unique payload identifier on which basis the unique fulfillment identifier was generated (406). For example, the authentication device 102 may decode the public key and the unique payload identifier from the unique fulfillment identifier, such as by inputting the unique fulfillment identifier to the two-way (viz., reversible) has algorithm used to generate the unique fulfillment identifier.

Using the previously stored private key corresponding to the decoded public key, the authentication device 102 decrypts the payload identifiers that were previously encrypted with this private key (408). The authentication device 102 thus retrieves the previously stored private key that corresponds to the decoded public key, as well as the payload identifiers that were encrypted using this private key as previously stored within a database, before proceeding to decrypt the payload identifiers. The decrypted payload identifiers are for the payloads of the group corresponding to the public key.

To authenticate the unique payload identifier decoded from the unique fulfillment identifier—and thus to authenticate the specific payload having this payload identifier—the authentication device 102 determines whether the decoded unique payload identifier is one of the decrypted payload identifiers (410). If the unique payload identifier of the specific payload is present within the decrypted payload identifiers (412), then authentication may be considered successful. The authentication device 102 therefore accordingly transmits an indication to the client device 106 that authentication based on the unique fulfillment identifier was successful (414).

However, if the unique payload identifier of the specific payload is absent from the decrypted payload identifiers (412), then authentication is unsuccessful. The authentication device 102 accordingly transmits an indication to the client device 106 that authentication based on the unique fulfillment identifier was unsuccessful (416). In either case, the client device 106 receives indication as to whether such authentication succeeded or not (418).

The authentication device 102 may perform other checks or verifications during authentication in part 410. For example, in the case of a specific physical object that is being ordered, the authentication device 102 may confirm that the object has not already been indicated as having been sold. In the even more particular case of a printing device consumable item, the authentication device 102 may verify that the item has been installed in a printing device at a suitable geographic location when authentication is performed by the printing device upon installation. This type of verification can confirm, for instance, that the consumable item has not been sold or is being used in an unapproved market, as a gray market good.

Figure 5:
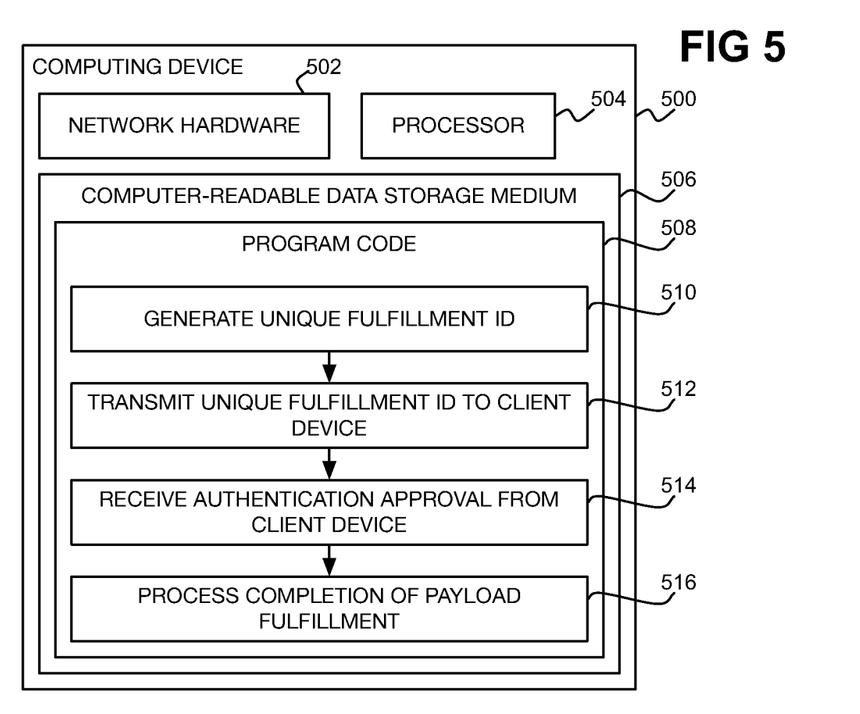
FIG. 5 is a block diagram of an example fulfillment device.

FIG. 5 shows an example computing device 500. The computing device 500 can implement the fulfillment device 104 that has been described. The computing device 500 includes network hardware 502, a processor 504, and a non-transitory computer-readable data storage medium 506 storing program code 508. The network hardware 502 may be a wired or wireless network adapter or chipset, for instance, to communicatively connect to a client device at which payload fulfillment has been initiated, as well as to an authentication device.

The processor 504 executes the program code 508 to perform processing. The processing includes generating, after initiation and prior to completion of the payload fulfillment, a unique fulfillment identifier by which authentication of the specific payload can occur (510). The unique fulfillment identifier can be generated based on a unique payload identifier of a specific payload and a unique group identifier of a group of payloads including the specific payload.

The processing that the processor 504 performs by executing the program code 508 can further include transmitting the unique fulfillment identifier to the client device (512). The processing that the processor 504 performs can include receiving approval of authentication of the specific payload from the client device based on the unique fulfillment identifier (514). The processing can include processing the completion of the payload fulfillment (516).

Figure 6:
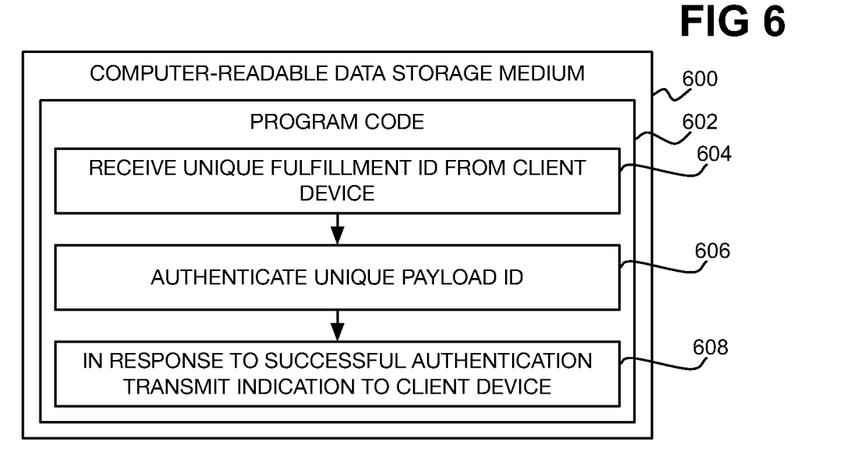
FIG. 6 is a block diagram of an example computer-readable data storage medium storing program code executable by an authentication device.

FIG. 6 shows an example non-transitory computer-readable data storage medium 600 storing program code 602 executable by an authentication device to perform processing. The processing includes receiving, from a client device, a unique fulfillment identifier corresponding to a unique payload identifier of a specific payload and a unique group identifier of a group of payloads including the specific payload, prior to completion of payload fulfillment (604). The processing includes authenticating the unique payload identifier based on the unique group identifier (606), and in response to successfully authenticating the unique payload identifier based on the unique group identifier, transmitting an indication of successful authentication of the payload to the client device (608).

Figure 7:
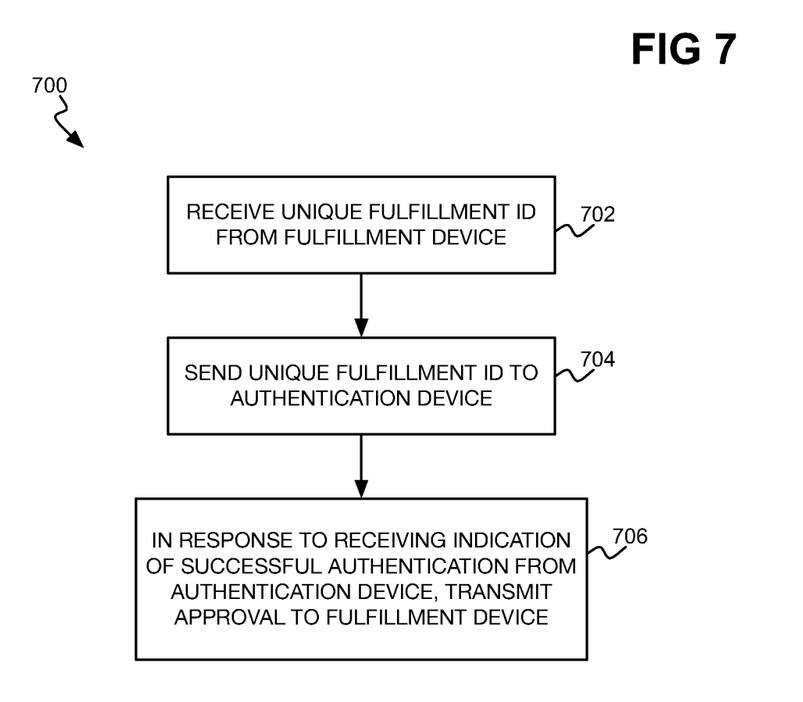
FIG. 7 is a flowchart of an example method performed by a client device.

FIG. 7 shows an example method 700. The method 700 includes receiving, by a client device from a fulfillment device, a unique fulfillment identifier corresponding to a unique payload identifier of a specific payload and a unique group identifier of a group of payloads including the specific payload, prior to completion of payload fulfillment (702). The method 700 includes sending, by the client device to an authentication device, the unique fulfillment identifier to authenticate the specific payload (704). The method 700 includes, in response to receiving an indication of successful authentication of the specific payload from the authentication device, transmitting, by the client device, approval of the authentication of the specific payload to the fulfillment device (706), with the fulfillment device responsively processing the completion of the payload fulfillment.

Payload authentication techniques have been described herein. The described techniques provide for payload authentication after initiation and prior to completion of payload fulfillment. In the case of a payload that is a physical object, the physical object can thus be authenticated without there being physical access or possession to the object.

We claim:

1. A non-transitory computer-readable data storage medium storing program code executable by an authentication device to perform processing comprising:
receiving, from a client device, a unique fulfillment identifier corresponding to a unique payload identifier of a specific payload and a unique group identifier of a group of payloads including the specific payload, prior to completion of payload fulfillment;
authenticating the unique payload identifier based on the unique group identifier; and
in response to successfully authenticating the unique payload identifier based on the unique group identifier, transmitting an indication of successful authentication of the payload to the client device.

2. The non-transitory computer-readable data storage medium of claim 1, wherein the processing further comprises:
in response to unsuccessfully authenticating the unique payload identifier based on the unique group identifier, transmitting an indication of unsuccessful authentication of the payload to the client device.

3. The non-transitory computer-readable data storage medium of claim 1, wherein the unique group identifier comprises a public encryption key corresponding to a private encryption key confidentially maintained at the authentication device, and authenticating the unique payload identifier comprises:
decrypting a plurality of payload identifiers of the payloads of the group previously encrypted using the private encryption key; and
determining whether the payload identifier of the specific payload is present within the decrypted payload identifiers.

4. The non-transitory computer-readable data storage medium of claim 1, wherein the unique group identifier comprises a public encryption key corresponding to a private encryption key confidentially maintained at the authentication device, and the processing further comprises:
prior to initiation of payload fulfillment at the client device, encrypt a plurality of payload identifiers of the payloads of the group with the private encryption key; and
transmit the public encryption key to a fulfillment device at which the completion of the payload fulfillment occurs.

5. The non-transitory computer-readable data storage medium of claim 1, wherein the payload comprises a printing device consumable item, the unique payload identifier comprises a serial number of the printing device consumable item, the group of payloads comprises a lot of printing device consumable items, and the unique group identifier comprises a lot number of the lot of printing device consumable items.

6. A computing device comprising:
network hardware to communicatively connect to a client device at which payload fulfillment has been initiated;
a processor; and
a non-transitory computer-readable data storage medium storing program code executable by the processor to:
generate, after initiation and prior to completion of the payload fulfillment, a unique fulfillment identifier by which authentication of the specific payload occurs, based on a unique payload identifier of a specific payload and a unique group identifier of a group of payloads including the specific payload;
transmit the unique fulfillment identifier to the client device;
receive approval of authentication of the specific payload from the client device based on the unique fulfillment identifier; and
process the completion of the payload fulfillment.

7. The computing device of claim 6, wherein the network hardware is further to communicatively connect to an authentication device,
wherein the program code is further executable by the processor to, prior to the initiation of the payload fulfillment, receive the unique group identifier and the unique payload identifier from the authentication device.

8. The computing device of claim 7, wherein the unique group identifier comprises a public encryption key corresponding to a private encryption key confidentially maintained at the authentication device and by which the authentication device has encrypted and stored a unique payload identifier of each payload of the group.

9. The computing device of claim 6, wherein the program code is further executable by the processor to:
responsive to receiving the initiation of the payload fulfillment from the client device, select the specific payload on which basis the payload fulfillment is to occur; and
upon selection of the specific payload, determine the unique payload identifier of the payload fulfillment.

10. The computing device of claim 6, wherein the payload comprises a printing device consumable item, the unique payload identifier comprises a serial number of the printing device consumable item, the group of payloads comprises a lot of printing device consumable items, and the unique group identifier comprises a lot number of the lot of printing device consumable items.

11. A method comprising:
receiving, by a client device from a fulfillment device, a unique fulfillment identifier corresponding to a unique payload identifier of a specific payload and a unique group identifier of a group of payloads including the specific payload, prior to completion of payload fulfillment;
sending, by the client device to an authentication device, the unique fulfillment identifier to authenticate the specific payload; and
in response to receiving an indication of successful authentication of the specific payload from the authentication device, transmitting, by the client device, approval of the authentication of the specific payload to the fulfillment device, the fulfillment device responsively processing the completion of the payload fulfillment.

12. The method of claim 11, further comprising:

in response to receiving an indication of unsuccessful authentication of the specific payload from the authentication device, terminating, by the client device, the payload fulfillment.

13. The method of claim 11, further comprising:

initiating, by the client device, the payload fulfillment with the fulfillment device, wherein the unique fulfillment identifier is received after the payload fulfillment is initiated.

14. The method of claim 11, wherein the unique group identifier comprises a public encryption key corresponding to a private encryption key confidentially maintained at the authentication device and by which the authentication device has encrypted and stored a unique payload identifier of each payload of the group.

15. The method of claim 11, wherein the payload comprises a printing device consumable item, the unique payload identifier comprises a serial number of the printing device consumable item, the group of payloads comprises a lot of printing device consumable items, and the unique group identifier comprises a lot number of the lot of printing device consumable items.

* * * * *